# 2,821,509

METHOD OF MAKING AN ELECTROLUMINESCENT ZINC SULFIDE PHOSPHOR

Brian E. Hunt, Bushey Heath, and Alfred H. McKeag, North Wembley, England, assignors to General Electric Company, a corporation of New York No Drawing. Application August 19, 1954
Serial No. 451,054

4 Claims. (Cl. 252—301.6)

This invention relates to the manufacture of artificial luminescent materials which possess the property of electroluminescence, that is to say of being excited to luminescence when placed in a fluctuating electric field.

Electroluminescent materials are employed in devices, known as electroluminescent devices, which comprise a luminescent material associated with means for subjecting the material to the action of a fluctuating electric field; such a device may, for example, comprise a layer of luminescent material sandwiched between two conducting plates, usually together with a dielectric material for insulating the plates, so as to be excitable to luminescence by the application of an alternating voltage between said plates, at least one of the plates being partly or wholly transparent for the emission of light from the device.

One known electroluminescent material consists of zinc sulphide activated by copper: this material is usually excited by a fluctuating electric field to luminescence of a green or bluish-green color, but may show a blue luminescence of rather low intensity.

It is an object of the present invention to provide a method of manufacturing an electroluminescent material by means of which a material exhibiting electroluminescence of a blue or blue-green color of good brightness can be obtained.

According to the invention, a method of manufacturing an electroluminescent material comprises firing zinc sulphide at a temperature above 950° C., cooling the zinc sulphide, forming a mixture containing the fired zinc sulphide and a suitable compound of copper in an amount such that the proportion of copper present is in the range of 0.01% to 1% by weight of the mixture, and heating this mixture at a temperature in the range of 600–950° C.

Neither heating step should be carried out in a strongly oxidising atmosphere: the mixture to be heated, in each case, is usually contained in a confined space, so that the access of air to the material during the heating is restricted.

The prefiring step, that is to say the step of firing the zinc sulphide prior to mixing it with the copper, may be carried out at any convenient temperature higher than 950° C. and below the temperature at which zinc sulphide volatilizes: the preferred temperatures are from 1100° C. to 1300° C. The duration of the prefiring is preferably about 2 hours.

The copper activated zinc sulphide produced by the method of the invention is excited by the application of a fluctuating electric field to luminescence of a blue or blue-green color, and we have succeeded in obtaining materials of greatly improved brightness as compared with the electroluminescence shown by copper activated zinc sulphide produced by methods employed heretofore, which do not include a prefiring step. The bright blue electroluminescene of these materials can therefore be attributed to the prefiring step.

The mixture containing prefired zinc sulphide and a copper compound which is subjected to a second firing step in accordance with the invention may also include zinc oxide in a proportion up to about 50% by weight of the mixture. It has been found that the inclusion of zinc oxide in the mixture tends to improve the brightness of the electroluminescence of the product. The proportion of zinc oxide employed is not critical, variations of the proportion used between 10% and 50% producing little variation in the electroluminescent properties of the product.

The proportion of copper included in the mixture within the limits specified above is not critical, since good results are obtained with proportions anywhere within these limits. Materials showing particularly bright electroluminescence are obtained, however, when the proportion of copper present in the initial mixture is about 0.1% to 0.25% by weight of the mixture. The copper compound used is preferably one that is soluble in water, since the use of a solution facilitates thorough mixing with the zinc sulphide.

The second heating step, after admixture of the prefired zinc sulphide with the copper compound, and optionally with zinc oxide, is preferably carried out at a temperature in the range of 700° C. to 900° C. The duration of this second heating step is considerably longer than that of the prefiring step, and varies according to the temperature employed: for example, firing at a temperature of 850° C. may be continued for 15 hours.

Preferably no fluxes are added to the mixture containing prefired zinc sulphide and copper, although the presence of small amounts, of the order of 10% by weight, of salts such as ammonium chloride or zinc chloride, which are often present in commercially obtained zinc sulphide, may be advantageous in assisting crystal growth. Moreover the zinc sulphide employed may be precipitated zinc sulphide containing a small amount of free sulphur, which provides a substantially neutral atmosphere during the prefiring step. In other respects it will be understood that the materials used in the method of the invention must be of a high degree of purity, as is usual in the manufacture of luminescent materials.

After the mixture has been heated, the product is washed with suitable liquids for removing uncombined zinc oxide which it may contain, and also for removing superficial copper.

One specific method in accordance with the invention from the manufacture of an electroluminescent material will now be described by way of example.

In this method precipitated zinc sulphide is prefired at a temperature of 1250° C. for 2 hours in a tube plugged with glass wool. The fired zinc sulphide is allowed to cool, and is ground to a fine powder, and a mixture of the following constituents is then prepared:

300 grams prefired zinc sulphide, ZnS.
100 grams zinc oxide, ZnO.
0.4 gram copper in the form of an aqueous solution of copper sulphate, $CuSO_4.5H_2O$.

This mixture, which is in the form of a paste, is dried and ground, and the resulting powder is heated at 850° C. for a time sufficient to induce substantially maximum luminescent properties in the material, for example, 15 hours in a tube closed with a rubber bung fitted with a bunsen valve. The product is reground, and is washed first with 3 liters of a 10% aqueous solution of acetic acid, and then with 3 liters of a 1% aqueous solution of sodium cyanide: each washing step is carried out by allowing the powder to remain in contact with the washing liquid for 3 hours; the acetic acid removes uncombined zinc oxide, and the sodium cyanide solution removes superficial copper; the powder is finally washed with distilled water.

The washed powder is dried and sieved, and the fine powder thus obtained, when dispersed in a dielectric medium and placed between plates of tin-treated conducting glass together with an insulating sheet of mica, shows a strong blue luminescence when an alternating potential of 1000 volts at a frequency of 1500 cycles per second is applied between the said plates.

The effects of varying some of the conditions of the method of the invention for manufacturing electroluminescent copper activated zinc sulphide are indicated in the following table, which refers to a number of materials manufactured by methods which are modifications of the method described above by way of example. The table shows the effects of varying the prefiring temperature and the copper content, the indications of intensity of electroluminescence given being relative to one another. In preparing the materials referred to in this table, the zinc sulphide was prefired at the temperature indicated in each case for 2 hours, and the mixtures of 75% zinc sulphide and 25% zinc oxide, with the proportions of copper indicated, were heated at 900° C. It may be noted that when the zinc sulphide is prefired at the lower temperatures, the presence of a high proportion of copper results in the color of the electroluminescence of the material being blue-green rather than blue.

Table

| Prefiring Temperature, °C. | Copper Content, percent | Electroluminescence |
|---|---|---|
| 1,000 | 0.1 | Good blue. |
| 1,000 | 0.25 | Good blue-green. |
| 1,000 | 0.5 | Do. |
| 1,150 | 0.1 | Good-strong blue. |
| 1,150 | 0.25 | Good blue-green. |
| 1,150 | 0.5 | Do. |
| 1,250 | 0.1 | Strong blue. |
| 1,250 | 0.25 | Good-strong blue. |
| 1,250 | 0.5 | Good blue. |

What we claim as new and desire to secure by Letters Patent of the United States is:

1. The method of preparing an electroluminescent copper-activated zinc sulphide which comprises preliminarily firing zinc sulphide at a temperature above 950° C. but below its volatilization temperature for a period of approximately two hours, cooling the zinc sulphide, forming a mixture of the fired zinc sulphide with an activator compound of copper in an amount such that the proportion of copper is in the range of 0.01% to 1% by weight, and heating the mixture at a temperature in the range of 600° C. to 950° C. for a time sufficient to induce substantially maximum luminescent properties in the material.

2. The method of preparing an electroluminescent copper-activated zinc sulphide which comprises preliminarily firing zinc sulphide at a temperature above 950° C. but below its volatilization temperature for a period of approximately two hours, cooling the zinc sulphide, forming a mixture of the fired zinc sulphide with an activator compound of copper in an amount such that the proportion of copper is in the range of 0.01% to 1% by weight, and heating the mixture at a temperature in the range of 700° C to 900° C. for a time sufficient to induce substantially maximum luminescent properties in the material.

3. The method of preparing an electroluminescent copper-activated zinc sulphide which comprises preliminarily firing zinc sulphide at a temperature of approximately 1100° C. to 1300° C. for a period of approximately two hours, cooling the zinc sulphide, forming a mixture of the fired zinc sulphide with an activator compound of copper in an amount such that the proportion of copper is in the range of 0.01% to 1% by weight, and heating the mixture at a temperature in the range of 700° C. to 900° C. for a time sufficient to induce substantially maximum luminescent properties in the material.

4. The method of preparing an electroluminescent copper-activated zinc sulphide which comprises preliminarily firing zinc sulphide at a temperature above 950° C., but below its volatilization temperature for a period of approximately two hours, cooling the zinc sulphide, forming a mixture of the fired zinc sulphide with about 10-50% by weight of zinc oxide and an activator compound of copper in an amount such that the proportion of copper is in the range of 0.01% to 1% by weight of the zinc sulphide, and heating the mixture at a temperature in the range of 600° C. to 950° C. for a time sufficient to induce substantially maximum luminescent properties in the material.

References Cited in the file of this patent

Homer: J. Electrochem. Soc., December 1953, vol. 100, No. 12, pages 566–71.